Dec. 2, 1924.
C. L. LUCAS ET AL
1,517,790
MACHINE FOR BURNING-IN BEARINGS
Filed Jan. 6, 1922      2 Sheets-Sheet 1
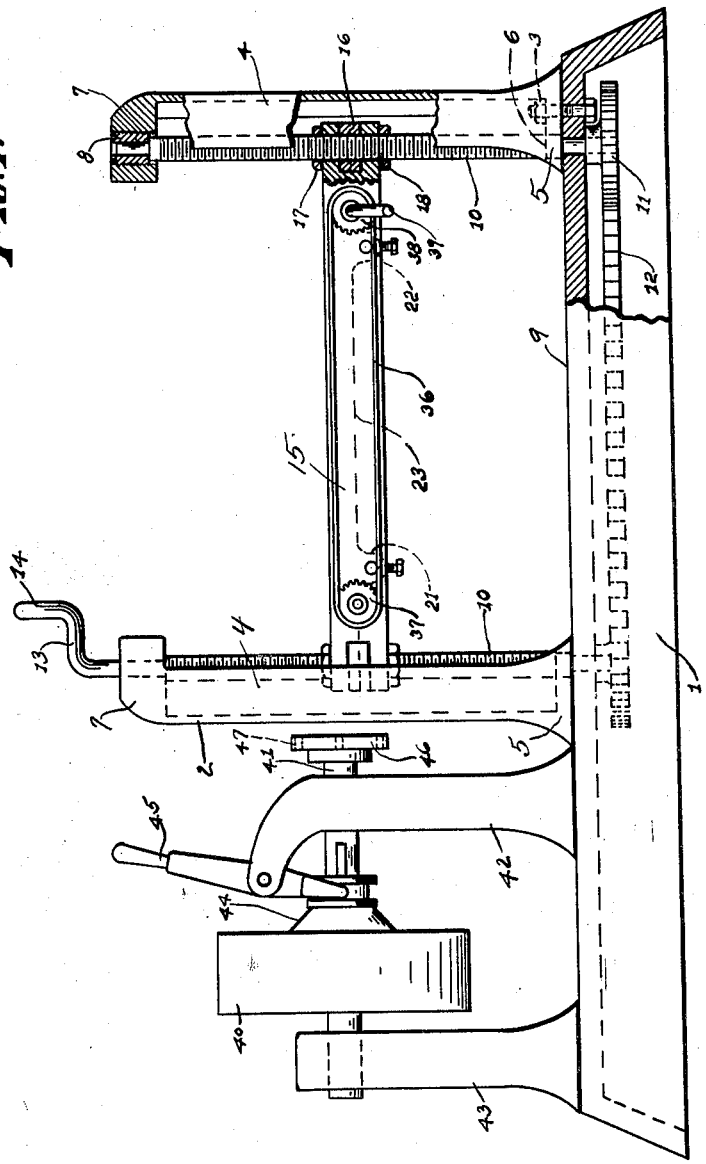
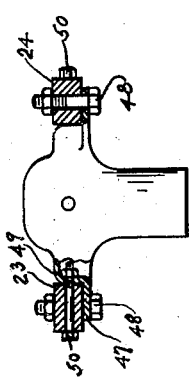
INVENTOR.
Carl L. Lucas
Robert W. Laubenheimer
BY
Erwin Wheeler & Woodard
ATTORNEYS.

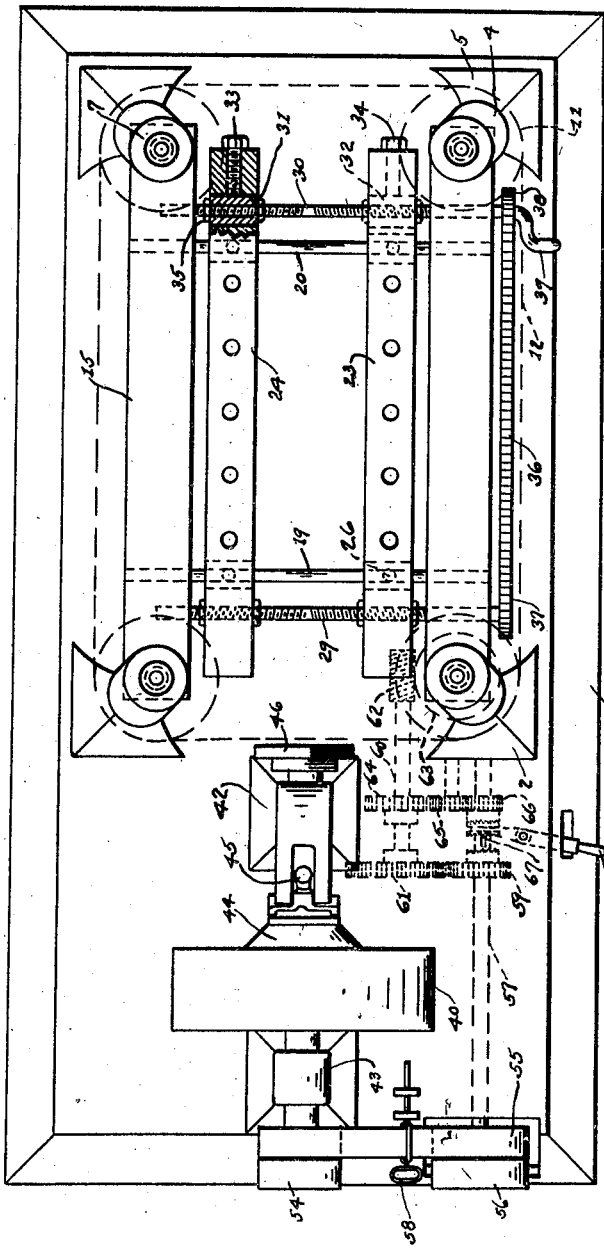

Patented Dec. 2, 1924.

1,517,790

UNITED STATES PATENT OFFICE.

CARL LOUIS LUCAS AND ROBERT W. LAUBENHEIMER, OF RICHFIELD, WISCONSIN.

MACHINE FOR BURNING IN BEARINGS.

Application filed January 6, 1922. Serial No. 527,340.

*To all whom it may concern:*

Be it known that CARL L. LUCAS and ROBERT W. LAUBENHEIMER, citizens of the United States, residing at Richfield, county of Washington, and State of Wisconsin, have invented new and useful Improvements in Machines for Burning in Bearings, of which the following is a specification.

This invention relates to machines for burning in bearings, and is particularly directed to a machine for burning in the bearings of internal combustion engines.

Objects of this invention are to provide a machine for burning in bearings of internal combustion engines, so as to accurately form the bearings with mirror-like surfaces; to provide a machine with means for accurately adjusting the height of the engine, so that its shaft will be perfectly aligned with that of the burning in machine; to provide a machine which may be locked in adjusted position to prevent chattering and wear, to provide a machine in which lateral adjustment of the engine may be quickly and accurately made; and to provide means for locking the engine supporting parts in their position of lateral adjustment.

Further objects are to provide a machine for burning in bearings, in which provision is made for taking up wear to prevent undesirable relative movements of parts of the supporting device; to provide means for maintaining the axis of the driving shaft in a parallel plane for all adjustments; and to provide a machine which may be simply and readily manufactured with comparatively little expense.

Further objects are to provide a burning in machine for internal combustion engines, in which a supporting table is provided with a plurality of spaced, elevating screws adapted for simultaneous operation, whereby the table is maintained in a horizontal plane for all adjustments; to provide such a table with laterally sliding portions adapted to be locked in any desired position; and to provide bearings for the screws so arranged that they may be adjusted to take up wear incident to the operation of the machine.

Embodiments of the invention are shown in the accompanying drawings, in which:—

Figure 1 is a side elevation of a machine embodying one form of the invention.

Figure 2 is a plan view of a machine showing a further form of the invention.

Figure 3 is a detail of means for taking up the wear of a portion of the machine.

Figure 4 is a partial sectional view of the supporting slides and an engine in position thereon.

Figure 5 is a detail of the slide locking means.

The machine comprises a hollow base portion 1 to which four upright channel section standards 2 are bolted, as indicated at 3. These standards are provided with side webs 4 which merge into an enlarged base portion 5, such portion conveniently being provided with a bottom web 6 through which the securing bolt passes. The upper portion of these standards has an enlarged or thickened member 7 formed integrally therewith, and provided with an adjusted threaded bushing 8, to be hereinafter described in detail.

Between the top portion 9 of the base portion and the enlarged portion 7 of the standards a plurality of screws 10 are rotatively positioned. These screws extend through the base portion 9 into the hollow portion of the base and are provided with sprocket wheels 11, connected by an endless chain 12 to cause simultaneous motion of the screws. One of the screws is extended upwardly beyond the enlarged portion 7 and is provided with a crank 13 equipped with an operating handle 14.

An adjustable table is carried by the screws 10 and is adapted to be elevated or lowered by a manipulation of the crank 13. The table is the same for both forms of the invention, and upon reference to Figure 2 it will be seen that such table, or support, comprises side members 15 which parallel the side of the machine and are supported at their forward and rear ends by the respective forward and rear screws 10. A convenient and easily assembled means for securing the desired threaded fit of the screws and side members 15 is illustrated in Figure 1. It will be noted that the ends of the members 15 are slotted, and that a blank or nut 16 is positioned within such slot and is threaded to co-operate with the screws 10. A pair of locking nuts 17 and 18 are positioned upon each screw and are adapted to be rotated so as to cause them to bind against the upper and lower faces of the side members 15 after the desired adjustment has been secured, thereby rigidly locking the side members 15 to the screws 10 and preventing chattering and consequent wear. The nuts or blanks 16 may be readily removed and replaced when worn without necessitating the discarding of the side members 15. A pair of guide rods 19 and 20 are secured in lugs 21 and 22, formed upon the under side of the members 15. Between the side members 15 a pair of parallel supporting members 23 and 24 are positioned and are slidably carried upon the guide members 19 and 20 by means of apertured lugs 25 corresponding to the lugs 21 and 22. These supporting slides may be locked in any desired adjusted position by means of set screws 27 passing through said lugs and engaging the lower portion of the guide rods 19 and 20—such guide rods preferably having a slightly flattened bottom face 28, as illustrated in Figure 5.

Means are provided for simultaneously moving the slides to either increase or decrease the distance between them, and at the same time maintain them in parallel relation. A convenient way of securing this adjustment is to provide a pair of screws 29 and 30, rotatively carried within the side members 15 and threaded to the slides 23 and 24. Each of these screws has oppositely threaded portions, as may be seen from an inspection of Figure 2. The screw 29 may be threaded directly into the members 23 and 24. It is found necessary, however, to provide bushings 31 and 32 for the other screw, such bushings conveniently being held in place by means of set screws 33 and 34. After the desired adjustment has been made chattering and consequent wear may be prevented by means of a plurality of lock nuts 35 which are forced against opposite sides of the slides 23 and 24, as shown in Figure 2. A convenient means of operating these screws simultaneously is furnished by the chain drive, indicated at 36, and the sprocket wheels 37 and 38 rigidly mounted upon the screws 29 and 30. An operating crank 39 may be formed integrally with either of the screws 29 or 30, or, as shown in the drawings, it may be formed separately so that it may be removed to allow greater freedom of movement for the operator about the machine.

The power driven mechanism for rotating the shaft of the engine comprises a driven pulley 40 loosely mounted upon a shaft 41, such shaft being carried in bearings in the standards 42 and 43. A clutch 44 is provided upon the shaft 41 to couple such shaft operatively with the driven pulley 40 and may be operated by means of the lever 45. The end of the shaft nearest the adjustable table has keyed thereto a flange coupling 46 provided with a plurality of bolt holes 47. This coupling is adapted to be joined operatively to the engine shaft in any desired manner after the engine shaft has been accurately aligned with the shaft 41.

Figure 4 shows an engine in position upon the slides 23 and 24 and illustrates the manner of securing the engine and such slides. It is to be noted that with this type of engine, it is found more expedient to invert the engine and secure the outwardly projecting flanges 47 to the under side of the slides 23 and 24 by means of bolts 48, and to secure the vertical webs 49 to the inner side of the slides 23 and 24 by means of bolts 50, such slides being provided with a plurality of spaced holes through both its top and bottom faces and its side faces.

It is understood that it is imperative to insure the accurate alignment of the engine shaft with that of the shaft 41, and this condition necessitates the maintaining at all times of the adjustable table in a horizontal plane. It is, therefore, necessary to provide means for taking up the wear in the bearings of the screws 10. Figure 3 illustrates upon an enlarged scale, the adjustable bushing 8 which is threaded into the enlarged portion 7 of the standards. It will be seen that these bushings receive a reduced portion 51 of the screws 10 and bear at their bottom faces against the shoulders 52 formed upon such screws. When wear occurs the bushings 8 are screwed down into more intimate contact with the shoulders 52, such operation being conveniently performed by means of a spanner wrench provided with projecting pins,—recesses 53 being formed in the bushing 8 to accommodate the pins of the spanner wrench.

In the modified form shown in Figure 2, the manually operable crank 13 for the screws 10 is omitted, and means are provided for transmitting motion from the shaft 41 to such screws. This means comprises a pulley 54 rigidly secured upon the shaft 41 and belted either to a tight pulley 55 or a loose pulley 56 mounted upon a jack shaft 57. The position of the belt may be controlled in any desired manner, as by means of a belt shifter 58. The jack shaft 57 is mounted beneath the top of the base portion and extends to a point adjacent one of the vertical screws. Its inner end is provided with a pinion 59. A shaft 60 is also mounted beneath the top of the base portion and carries a gear 61 at its forward end, arranged to mesh with the pinion 59 and carries at its inner end a worm 62 adapted to mesh with a worm wheel 63 secured upon one of the screws 10. A second gear 64 is mounted upon the shaft 60 and, through the idler 65, is operatively coupled with the second drive gear 66 on the shaft 57. The gears 61 and 64 are tight upon the shaft 60 and the gears 59 and 66 are loose upon the shaft 57. A clutch member 67 is loosely splined upon the shaft 57 and is adapted to cooperate with corresponding members formed upon the gears 59 and 66 to thereby connect either of such gears with the shaft 57. A controlling or reversing lever 68 is pivoted to the frame and controls the member 67. It is obvious that if desired, the tight and loose pulley 55 and 56 may be replaced by a single tight pulley and the entire control of the power driven mechanism may be had through the lever 68. It may, however, be desirable to employ both the tight and loose pulley and the clutch to thereby minimize wear.

The operation of the device is as follows:—The securing set screws 27 for the slides 23 and 24 are loosened, and if the lock nuts 35 are employed, they are backed away from the inner and outer faces of the slides. Thereafter, the crank 39 is operated to move the slides into the exact position for accommodating the engine base. The engine is now bolted to the slides,—one manner of bolting being shown in Figure 4. Thereafter, the entire table is raised or lowered until the exact aligning of the engine shaft and the shaft 41 is secured. This raising or lowering of the table may be secured by means of the crank 13 in the first form of invention, or by means of the power driven elevating mechanism of the second form of the invention. After this aligning has been secured, the coupling 46 is operatively connected to the engine shaft. The pulley 40 is then locked to the shaft 41 by means of the manually operable lever 45 and the clutch 44, and the engine shaft is consequently rotated. During this initial operation, the bearings are free from oil and any high points that exist are immediately smoothed down jointly by the heat, pressure and friction, in a well-known manner. After the desired shaping of the bearings has been attained, oil is supplied them and the engine shaft is again rotated. In this manner a mirror-like surface is produced in the bearings and the engine is limbered up in the desired manner.

It will thus be seen that a burning in machine has been provided in which accurate alignment of the engine shaft and power driven shaft may be quickly and easily secured; in which means are provided for locking the engine in the adjusted position; and in which means are provided for maintaining accurate adjustment of the engine. It will further be seen that a burning in machine has been provided in which any type of engine may be accommodated and may be readily treated.

We claim:

1. In a device of the character described, the combination with a relatively fixed bearing element and a power driven shaft therein, of an adjustable engine support including a pair of parallel, laterally movable side members symmetrically disposed with reference to said shaft, actuators each operatively connected with both members and positive driving connections between said actuators for their simultaneous operation, said actuators being adapted to impel said members in opposite directions whereby their symmetry and parallelism are preserved during lateral movement.

2. In a device of the character described, the combination with a relatively fixed bearing element and a power driven shaft therein, of a vertically adjustable table, an adjustable engine support including a pair of parallel, laterally movable side members mounted on said table and symmetrically disposed with reference to said shaft, actuators each operatively connected with both members and positive driving connections between said actuators for their simultaneous operation, said actuators being adapted to impel said members in opposite directions whereby their symmetry and parallelism are preserved during lateral movement.

3. In a device of the character described, the combination with a relatively fixed bearing element and a power driven shaft therein, of a vertically adjustable table, an adjustable engine support including a pair of parallel, laterally movable side members mounted on said table and symmetrically disposed with reference to said shaft, actuator screws each provided with a right hand, threaded portion operatively connected with one of the side members and a left hand, threaded portion operatively connected with the other of said members, and positive driving connections between said screws for their simultaneous operation whereby the side members may be impelled in opposite directions and their symmetry and parallelism are preserved during lateral movement.

4. In a machine for burning in the shaft bearings of engines, the combination with a base, of a plurality of spaced standards secured to the base, a plurality of screws each provided at one end with a bearing in the base and at the other end with a bearing in a corresponding standard, positive driving connections between said screws adapted to operate them simultaneously and in unison, a table supported from said screws to be raised or lowered thereby, engine supporting members carried by the table, means on the table for adjusting said members laterally of each other, and a power driven rotor supported from the base whereby the members may be adjusted to support different sizes of engines and the table adjusted in height to align the shaft of an engine thereon with the rotor.

5. In a machine for burning in the shaft bearings of engines, the combination with a base, of a plurality of spaced, vertically extending screws journaled in the base, adjustable means for holding the screws against vertical movement of their respective axes, means for operating said screws simultaneously and in unison, a table comprising separated side members each threadedly connected with a pair of said screws, slide bars connecting said members together, engine supporting members mounted on said slide bars and adapted to move longitudinally thereof, horizontally extending screws carried by the side members and adapted to actuate the supporting members in opposite directions, means for actuating said horizontally extending screws simultaneously and in unison, and power driven means carried by the base and adapted to be connected with the shaft of an engine carried by said table.

6. In a machine for burning in the shaft bearings of engines, the combination with a base, of power driven means supported from the base and including a horizontal shaft, adjustable means supported from the base and adapted to support an engine, means for adjusting the supporting means vertically and horizontally, the adjusting means being adapted to maintain the supporting means in alignment with the power driven means in anyone of the plurality of adjustments thereof, whereby an engine may be supported from the supporting means and the shaft thereof accurately aligned axially with the horizontally extending shaft.

CARL LOUIS LUCAS.
ROBERT WILLIAM LAUBENHEIMER.